US011300399B2

(12) United States Patent
Ausserlechner

(10) Patent No.: US 11,300,399 B2
(45) Date of Patent: Apr. 12, 2022

(54) DEVICE AND METHOD FOR DETERMINING THE POSITION OF A PERMANENT MAGNET

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 145 days.

(21) Appl. No.: 16/459,898

(22) Filed: Jul. 2, 2019

(65) Prior Publication Data
US 2020/0018589 A1 Jan. 16, 2020

(30) Foreign Application Priority Data
Jul. 11, 2018 (DE) .......................... 102018211500.1

(51) Int. Cl.
*G01B 7/30* (2006.01)
(52) U.S. Cl.
CPC ..................................... *G01B 7/30* (2013.01)
(58) Field of Classification Search
None
See application file for complete search history.

(56) References Cited

U.S. PATENT DOCUMENTS

| 2003/0000307 A1* | 1/2003 | Lohberg | G01D 5/145 73/514.16 |
| 2004/0112145 A1* | 6/2004 | May | G01L 3/101 73/862.331 |
| 2009/0001971 A1* | 1/2009 | Racz | G01D 5/145 324/207.25 |
| 2009/0251830 A1* | 10/2009 | Kurata | G01R 33/09 360/324 |

FOREIGN PATENT DOCUMENTS

| DE | 19910636 A1 | 9/2000 |
| DE | 10162849 A1 | 7/2003 |
| DE | 20210548 U1 | 8/2003 |
| DE | 102017222674 A1 | 7/2018 |
| EP | 2568259 A1 | 3/2013 |

* cited by examiner

*Primary Examiner* — Nasima Monsur
(74) *Attorney, Agent, or Firm* — Harrity & Harrity, LLP

(57) ABSTRACT

A device comprises a permanent magnet, a magnetic field sensor, and an evaluation circuit. The permanent magnet has a body extending along a path, wherein in a movement travel region the permanent magnet has a continuous north pole and a continuous south pole and is magnetized in such a way that the magnetization direction along the path rotates continuously around the path. The permanent magnet is arranged in an inner spatial region and the at least one sensor is arranged in an outer spatial region, wherein in cross section perpendicular to the path the inner spatial region and the outer spatial region are separated from one another by an outwardly convex line. The magnetic field sensor is configured to detect the magnetic field generated by the permanent magnet. The evaluation circuit is configured to determine the position of the permanent magnet using the detected magnetic field.

24 Claims, 11 Drawing Sheets

Moving a permanent magnet relative to a magnetic field sensor, wherein the permanent magnet comprises a body extending along a path, wherein, in cross section perpendicular to the path, the body has a compact form, wherein in a movement travel region the permanent magnet has a continuous north pole and a continuous south pole and is magnetized in such a way that the magnetization direction along the path rotates continuously around the path ~100

↓

Detecting a magnetic field generated by the permanent magnet by means of a magnetic field sensor arranged in an outer spatial region, wherein the permanent magnet is arranged in an inner spatial region and the inner and outer spatial regions are separated by an outwardly convex line ~102

↓

Determining the position of the permanent magnet using the detected magnetic field ~104

Fig. 12

DEVICE AND METHOD FOR DETERMINING THE POSITION OF A PERMANENT MAGNET

RELATED APPLICATION

This application claims priority under 35 U.S.C. § 119 to German Patent Application No. 102018211500.1, filed on Jul. 11, 2018, the contents of which are incorporated by reference herein in their entirety.

TECHNICAL FIELD

The present disclosure is concerned with devices and methods for determining the position of a permanent magnet using at least one magnetic field sensor.

BACKGROUND

In a variety of fields, it is often desirable to detect the position of a movable part, for example of a part of a transmission or of a driveshaft. For this purpose, a permanent magnet can be fitted to the movable part, for example, in the form of a multipole ring magnet. The permanent magnet moves with the part whose position is intended to be detected, such that the position of the part can be deduced from the position of the magnet.

Overview

Diverse and economic systems which make it possible to detect the position of a permanent magnet and, thus, the position of a part to which the permanent magnet is secured and with which the permanent magnet moves would furthermore be desirable.

Examples of the present disclosure provide a device for determining the position of a permanent magnet, which device comprises a permanent magnet having a body extending along a path. In cross section perpendicular to the path, the body has a compact form. In a movement travel region the permanent magnet has a continuous north pole and a continuous south pole and is magnetized in such a way that the magnetization direction along the path rotates continuously around the path. The device comprises at least one magnetic field sensor configured to detect the magnetic field generated by the permanent magnet in the case of a relative movement between the permanent magnet and the magnetic field sensor. The device furthermore comprises an evaluation circuit configured to determine the position of the permanent magnet using the detected magnetic field. The permanent magnet is arranged in an inner spatial region and the at least one sensor is arranged in an outer spatial region, wherein in cross section perpendicular to the path the inner spatial region and the outer spatial region are separated from one another by an outwardly convex line.

In some examples of the present disclosure, the magnetization direction of a permanent magnet thus rotates continuously along a path, wherein the permanent magnet and the magnetic field sensor are movable relative to one another in such a way that the path moves past the magnetic field sensor. Consequently, the magnetic field acting on the magnetic field sensor as a result of the permanent magnet changes continuously on account of the rotation of the magnetic field along the path, such that the position of the permanent magnet relative to the magnetic field sensor can be determined by detecting the magnetic field brought about by the permanent magnet. The magnetic field sensor is arranged outside the outwardly convex separating line, such that it is possible to use a permanent magnet having an outer form that is easy to implement.

Examples of the present disclosure provide a method for determining the position of a permanent magnet having a body extending along a path, wherein, in cross section perpendicular to the path, the body has a compact form. In a movement travel region the permanent magnet has a continuous north pole and a continuous south pole and is magnetized in such a way that the magnetization direction along the path rotates continuously around the path. The method comprises detecting a magnetic field generated by the permanent magnet using at least one magnetic field sensor in the case of a relative movement between the permanent magnet and the magnetic field sensor. The permanent magnet is arranged in an inner spatial region and the at least one sensor is arranged in an outer spatial region, wherein in cross section perpendicular to the path the inner spatial region and the outer spatial region are separated from one another by an outwardly convex line. The position of the permanent magnet is determined using the detected magnetic field.

Examples of the present disclosure thus make it possible to detect the position of a correspondingly magnetized permanent magnet and, thus, to detect the position of a part to which the permanent magnet is fitted in such a way that the position of the permanent magnet corresponds to the position of the part, for example, of a shaft or of a part of a transmission.

BRIEF DESCRIPTION OF THE DRAWINGS

Examples of the disclosure are described below with reference to the accompanying drawings, in which:

FIG. 12 shows a flow diagram of one example of a method in accordance with the present disclosure.

DETAILED DESCRIPTION

Hereinafter, examples of the present disclosure are described in detail and using the accompanying drawings. It should be pointed out that identical elements or elements having an identical functionality are provided with identical or similar reference signs, a repeated description of elements provided with identical or similar reference signs typically being omitted. Descriptions of elements having identical or similar reference signs are mutually interchangeable. In the following description, many details are described in order to yield a more thorough explanation of examples of the disclosure. However, it is evident to those skilled in the art that other examples can be implemented without these specific details. Features of the variously described examples can be combined with one another, unless features of a corresponding combination are mutually exclusive or such a combination is expressly excluded.

Examples of the present disclosure make it possible to detect the position of a permanent magnet relative to at least one magnetic field sensor. In this case, the permanent magnet and the magnetic field sensor are arranged in such a way that a relative movement between same can take place. In some examples, the permanent magnet is arranged in a movable fashion and the magnetic field sensor is stationary. In some examples, the permanent magnet is stationary and the magnetic field sensor is movable. The relative movement results in a relative movement between the permanent magnet and the magnetic field sensor along the path. To put it another way, the magnetic field sensor can move as a result of the movement of the permanent magnet along the path.

In some examples, the permanent magnet can be ring-shaped and can rotate about a rotation axis, such that the relative movement is brought about by a rotation. In some examples, the permanent magnet can be elongate and the relative movement can be brought about by a linear movement of the permanent magnet. The path can be formed in each case by the geometric centers of the cross sections of the body perpendicular to the path.

In some examples, the permanent magnet is fitted to a component or element and used with the component or element, such that the position of the permanent magnet corresponds to the position of the component or element. Consequently, by determining the position of the permanent magnet, it is possible to determine the position of the component or element.

Figure 1:
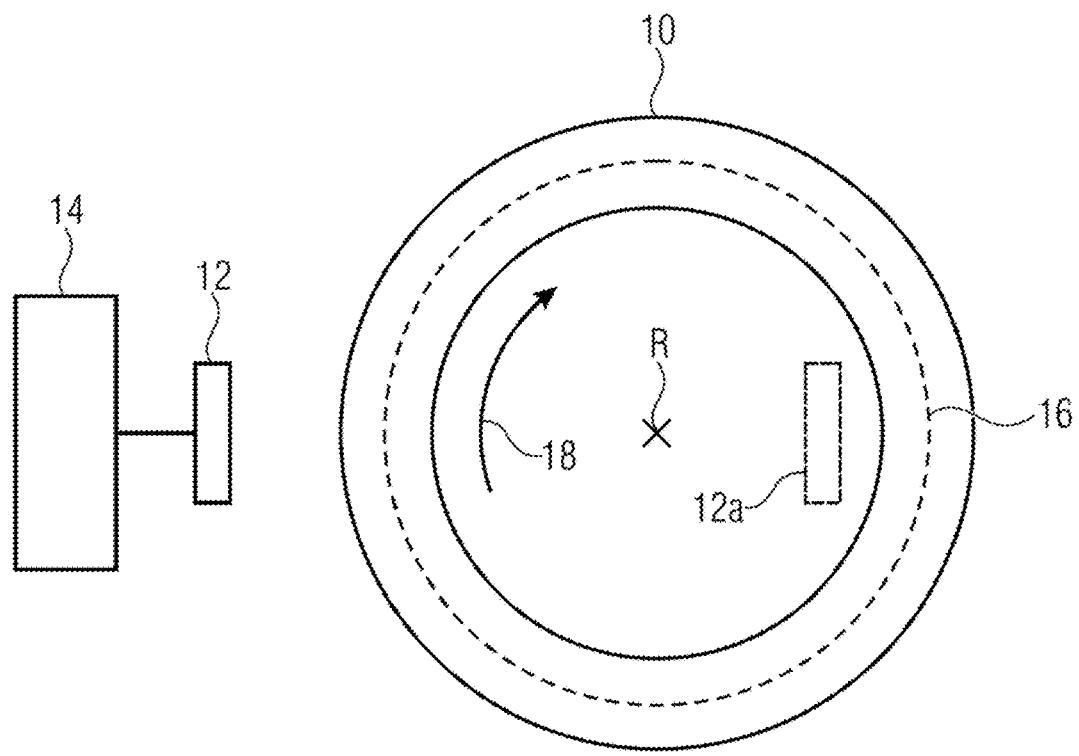
FIG. 1 shows a schematic illustration of one example of a device for determining the position of a ring-shaped permanent magnet.

FIG. 1 shows a schematic illustration of one example of a device for determining the position of a permanent magnet, which device comprises a ring-shaped permanent magnet 10 (toroid), a magnetic field sensor 12, and an evaluation circuit 14. The permanent magnet has a body extending along a path 16, which is represented by a dashed line in FIG. 1. The path 16 is circular in the case of the ring-shaped permanent magnet.

In the example shown in FIG. 1, the permanent magnet 10 is rotatable about a rotation axis R, as is shown by an arrow 18. Consequently, the permanent magnet 10 can rotate relative to the magnetic field sensor, such that a relative movement between the permanent magnet and the magnetic field sensor takes place along the path 16.

The body of the permanent magnet 10 has a compact form in cross section perpendicular to the path. As explained in greater detail below with reference to FIGS. 3A to 3E, the body of the permanent magnet 10 can have an outwardly convex outer boundary and the magnetic field sensor can be arranged outside the convex outer boundary. As is explained in greater detail below with reference to FIGS. 5 and 6, in a movement travel region the permanent magnet 10 has a continuous north pole and a continuous south pole and is magnetized in such a way that the magnetization direction along the path 16 rotates continuously around the path 16.

The magnetic field sensor 12 is configured to detect the magnetic field generated by the permanent magnet 10 during the described relative movement between magnetic field sensor 12 and permanent magnet 10. In some examples, the at least one magnetic field sensor is configured and arranged relative to the permanent magnet so as to detect a magnetic field component in a first direction, which is parallel to the rotation axis R, and a magnetic field component in a second direction, which is perpendicular to the rotation axis and perpendicular to the direction of the path 16, wherein the evaluation circuit 14 is configured to determine the position of the permanent magnet using the detected magnetic field components. In the case of the ring-shaped permanent magnet, the direction of the path corresponds to the tangential direction of the annulus.

In the example shown in FIG. 1, the magnetic field sensor is arranged radially outside the permanent magnet 10 with respect to the rotation axis R. In alternative examples, the magnetic field sensor can be arranged radially within the permanent magnet with respect to the rotation axis R, as is indicated by a magnetic field sensor 12a illustrated by dashed lines in FIG. 1. The magnetic field sensor 12 is coupled to an evaluation circuit 14 configured to determine the position of the permanent magnet 10 using the detected magnetic field.

In some examples, the permanent magnet 10 is secured to a shaft concentrically in order to rotate with the shaft, such that the angular position of the permanent magnet corresponds to the angular position of the shaft. Consequently, by determining the angular position of the permanent magnet, it is possible to determine the angular position of the shaft.

The movement travel region corresponds to the region in which a relative movement between permanent magnet and magnetic field sensor is possible. In some examples, said movement travel region corresponds to a complete rotation of 360°. In other examples, the movement travel region can be restricted to a specific angular range, for example a range of 180° or 120°. Such a restriction may be expedient in specific applications, for example in applications for detecting the angular position of a shaft that is not rotatable by a full 360°, such as e.g. the shaft of a windshield wiper motor.

In the example shown in FIG. 1, the body of the permanent magnet is a ring-shaped body. In alternative examples, the body of the permanent magnet can be a ring-segment-shaped body, e.g. a non-closed ring. In some examples, the path along which the body extends can thus be circular or circle-segment-shaped.

Figure 2:
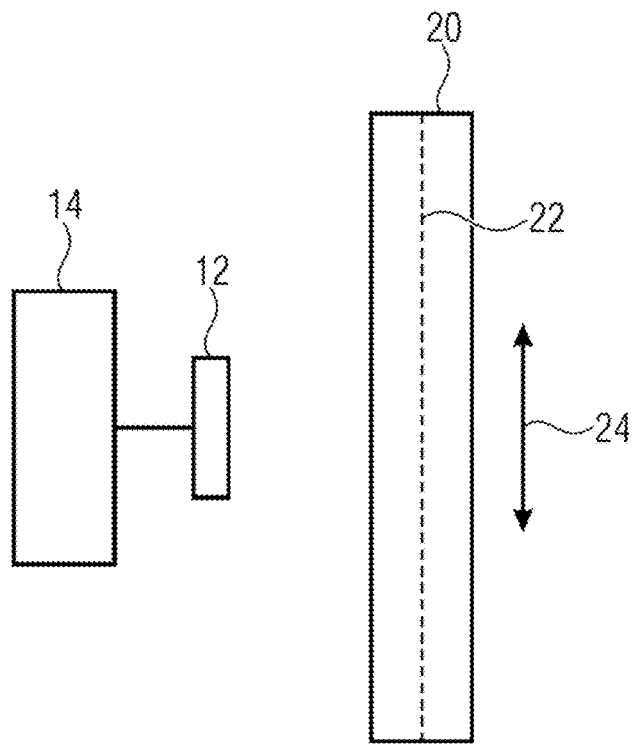
FIG. 2 shows a schematic illustration of one example of a device for determining the position of an elongate permanent magnet.

A further example of a device for determining a position of a permanent magnet, the body of which is an elongate body having a longitudinal axis, is shown in FIG. 2. FIG. 2 shows an elongate permanent magnet 20, which is movable along a path 22, as is indicated by an arrow 24 in FIG. 2. The distance over which the permanent magnet 20 can move linearly along the path 22 corresponds to the movement travel region. In this case, the path 22 corresponds to the longitudinal axis of the permanent magnet 20 and is straight.

The body of the permanent magnet 20 has a compact form in cross section perpendicular to the path. The body of the permanent magnet 20 can once again have an outwardly convex outer boundary in cross section perpendicular to the path 22. In the movement travel region the permanent magnet 20 has a continuous north pole and a continuous south pole and is magnetized in such a way that the magnetization direction along the path 22 rotates continuously around the path. The magnetic field sensor 12 can once again be arranged outside the convex outer boundary of the body of the permanent magnet 20 and is configured to detect the magnetic field generated by the permanent magnet 20 in the case of a relative movement 24 between the permanent magnet 20 and the magnetic field sensor 12. In this example, the relative movement is a rectilinear movement and once again has the effect that a relative movement between magnetic field sensor and permanent magnet takes place along the path 22.

The magnetic field sensor 12 is once again coupled to an evaluation circuit 14 configured to determine the position of the permanent magnet using the detected magnetic field. In some examples, the magnetic field sensor 12 is configured to detect a magnetic field component in a first direction and a magnetic field component in a second direction, which is different than the first direction, wherein the first direction and the second direction are perpendicular to a longitudinal axis of the permanent magnet 20. In some examples, the evaluation circuit is configured to determine the position of the permanent magnet using the detected magnetic field components. The first direction can be perpendicular to the second direction.

The cross section of the body of the permanent magnet perpendicular to the path is compact. Compact should be understood here to mean that a ratio of arbitrary dimensions in mutually perpendicular directions of the cross section of the body perpendicular to the path (aspect ratio) is not greater than 3, preferably not greater than 2, even more preferably not greater than 1.25. The cross section of the body can be circular, square or polygonal (for example pentagonal or octagonal) with rounded corners, since it is thereby possible to generate a magnetic field for the sensors which rotates uniformly if the magnetization direction rotates uniformly in cross section. If the cross section had pointed corners or were very elongate, for example like a slender rectangle, the magnetic field acting on the sensors would not rotate coherently with the magnetization direction in the cross section and the amplitude of the magnetic field acting on the sensors would not remain constant. In some examples, the cross section has no pointed corners and the aspect ratio of the cross section perpendicular to the path lies between 0.5 and 2, preferably between 0.75 and 1.25.

Figure 3A:
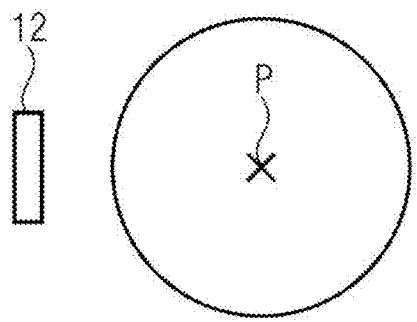
FIGS. 3A-3F show examples of cross sections of a permanent magnet perpendicular to a path along which the body of the permanent magnet extends.
Figure 3B:
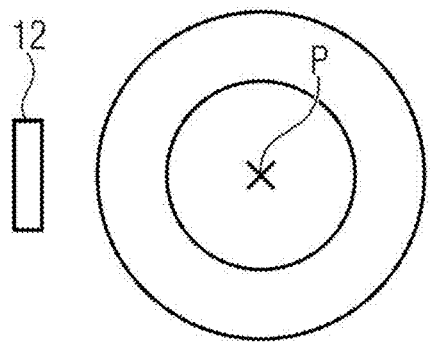
Figure 3C:
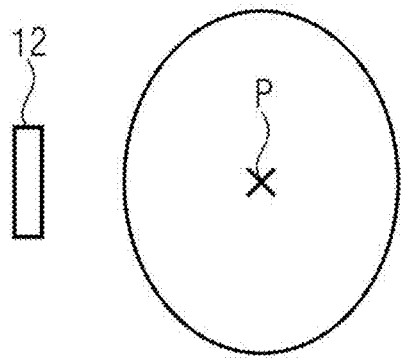
Figure 3D:
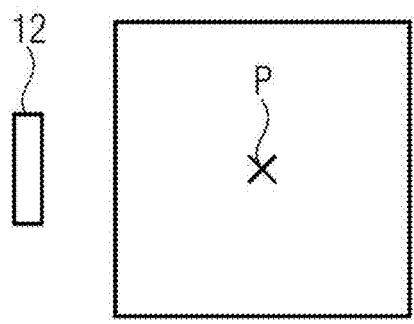
Figure 3E:
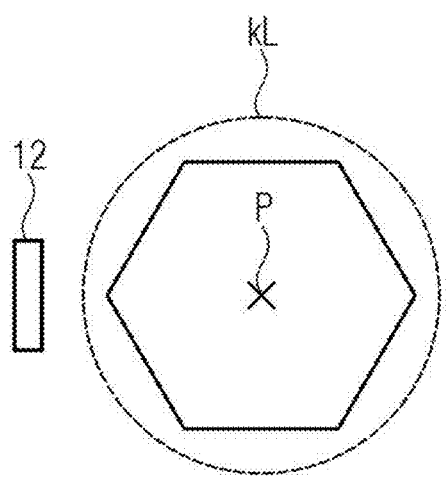

FIGS. 3A to 3E show various cross sections of permanent magnet bodies perpendicular to the path along which the body extends, with convex outer boundaries. In accordance with FIG. 3A, the cross section is circular, such that the convex outer boundary is also circular. In such an example, a ring-shaped permanent magnet constitutes a torus and an elongate permanent magnet constitutes a cylinder. The path along which the body of the permanent magnet extends is identified in each case by the letter P in FIGS. 3A to 3E. FIG. 3B shows a ring-shaped cross section, such that a central region of the permanent magnet is hollow. A corresponding ring-shaped permanent magnet thus constitutes a hollow torus and a corresponding elongate permanent magnet constitutes a hollow cylinder (wherein the cavity can also be filled, if appropriate, with magnetically inert material such as e.g. plastic, brass, aluminum, high-grade steel, which serves e.g. for the securing of the magnet or for the mechanical strength of the structure). FIG. 3C shows an oval cross-sectional shape, FIG. 3D shows a square cross-sectional shape, and FIG. 3E shows a hexagonal cross-sectional shape. As indicated above, the corners of the cross sections shown in FIGS. 3D and 3E would preferably be rounded. It is evident to those skilled in the art that other cross-sectional shapes having a convex outer boundary can be used.

As is shown in FIGS. 3A to 3E, the magnetic field sensor 12, in cross section perpendicular to the path P, is arranged outside the outwardly convex outer boundary of the permanent magnet. To put it in general terms, the permanent magnet is arranged in an inner spatial region and the at least one magnetic field sensor is arranged in an outer spatial region, wherein in cross section perpendicular to the path the inner spatial region and the outer spatial region are separated from one another by an outwardly convex line. In some examples, the outer boundary of the cross section can thus also have concave sections, e.g. hollows at the corners of a square cross section.

Figure 3F:
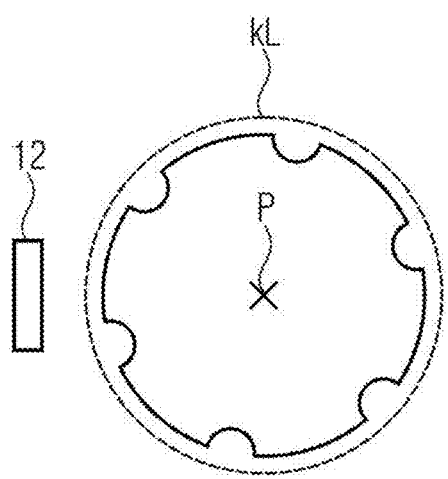

An outwardly convex outer boundary or an outwardly convex outer line should be understood here to mean a boundary or line having along same (as viewed from outside the cross section) only convex sections, but no concave sections. In this case, as is shown in FIGS. 3A to 3E, the boundary can represent the actual delimitation of the respective cross section. FIG. 3E furthermore depicts one example of an outwardly convex outer line kL, which separates the spatial regions from one another, as a dashed line. Consequently, in some examples, the actual boundary of the body has no groove, recess or pit into which a sensor is introduced. In some examples, the line separating the two spatial regions can be regarded as a virtual boundary having no concave sections, wherein actual concave sections of the body of the permanent magnet (if present) are replaced by straight or convex sections. FIG. 3F shows an example of a cross section in which the body has an outer boundary also having outwardly concave sections, wherein once again an outwardly convex outer line kL, which separates the spatial regions from one another, is depicted as a dashed line.

By virtue of the outwardly convex cross-sectional shape of the magnet or the outwardly convex separating line between the spatial regions, firstly the magnetization of the magnet can be applied equally well in all directions within the cross-sectional area, that is to say that it is possible for the magnetization during the magnetizing process not to be much stronger in one direction than in another direction. Secondly, it is not necessary for the magnetic field sensor to be threaded into a groove/undercut. In other words, it is possible to imagine an enveloping surface that is convex as viewed from outside, with the permanent magnet situated in the interior, and the magnetic field sensor in the exterior.

In some examples of the present disclosure, the cross section of the body is constant over the extent thereof. In alternative examples, the cross section can vary, wherein then for each cross section the magnetic field sensor is arranged outside a corresponding outwardly convex separating line. In some examples, the body of the permanent magnet can vary, wherein for each cross section the body has a convex outer boundary and for each cross section the magnetic field sensor is arranged outside the convex outer boundary.

Figure 4A:
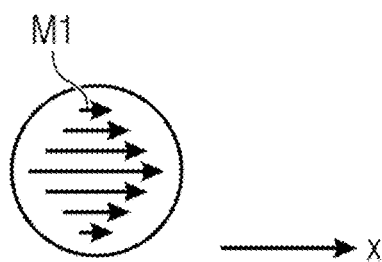
FIGS. 4A-4C show schematic cross-sectional illustrations of a permanent magnet for elucidating the rotating magnetization direction.
Figure 4B:
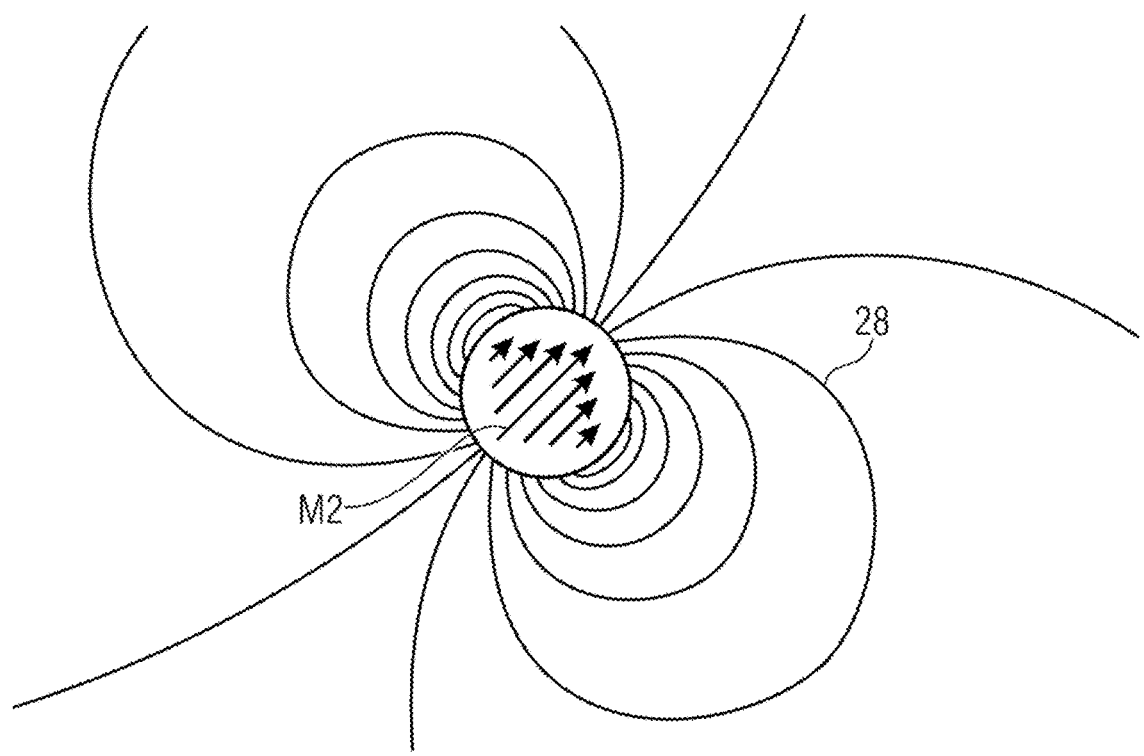
Figure 4C:
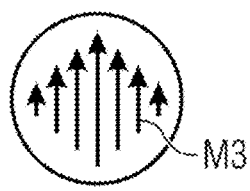

FIGS. 4A to 4C each show a circular cross section of a permanent magnet (perpendicular to the path—perpendicular to the plane of the drawing—along which the permanent magnet extends), with respective magnetization directions M1, M2, M3 indicated by respective arrows. The cross sections shown in FIGS. 4A to 4C here correspond to different cross sections along the extent of the permanent magnet.

If consideration is given to one cross section, then the magnetic centroid of the cross section is at the point $$\int_S \vec{M} \vec{r} dS / \int_S \vec{M} dS,$$

wherein $\vec{M}$ is the magnetization vector field, $\vec{r}$ is the source point of the magnetization vector field and S is the cross-sectional surface. By definition a path leads through the magnetic centroid perpendicular to the cross section. The angle between the average magnetization $$\int_S \vec{M} dS / \int_S dS$$

in the cross section and the positive x-axis shall be α.

With the horizontal positive x-axis being considered to be 0° and when moving in the counterclockwise direction, then the magnetization direction M1 has an angle of 0°, the magnetization direction M2 has an angle of 45° and the magnetization direction M3 has an angle of 90°. For α=45° and a circular cross section of the ring magnet, the magnetic field has the distribution shown by field lines 28 in FIG. 4B, which are generated by the magnetization direction M2. In this case, the magnetic flux density is highest at the surface of the magnet and greatly decreases radially outward.

Along the path along which the permanent magnet extends, the magnetization direction rotates continuously. Correspondingly, the magnetic field generated also rotates, such that by detecting this magnetic field, it is possible to determine the position of the magnetic field sensor along the path. In some examples of the present disclosure, the magnetization direction rotates by 360° within the movement travel region. A unique position of the permanent magnet is thus assigned to each magnetization direction. In some examples, the magnetization direction can rotate by a multiple of 360° around the path within the movement travel region. In such examples, each magnetization direction occurs repeatedly, and so further measures may be used in order to detect the current period of the rotation of the magnetization direction.

In some examples of the present disclosure, the magnetization of the permanent magnet in every cross section of the body that is perpendicular to the path is homogeneous in one direction, as is shown in FIGS. 4A to 4C. In FIGS. 4A to 4C the direction of the path is into the plane of the drawing and the x-axis is horizontal with respect to the plane of the drawing, as is indicated by the x-axis in FIG. 4A. In some examples, the magnetization is not homogenous, in which case reference can then be made to an average magnetization direction per cross section.

Figure 5:
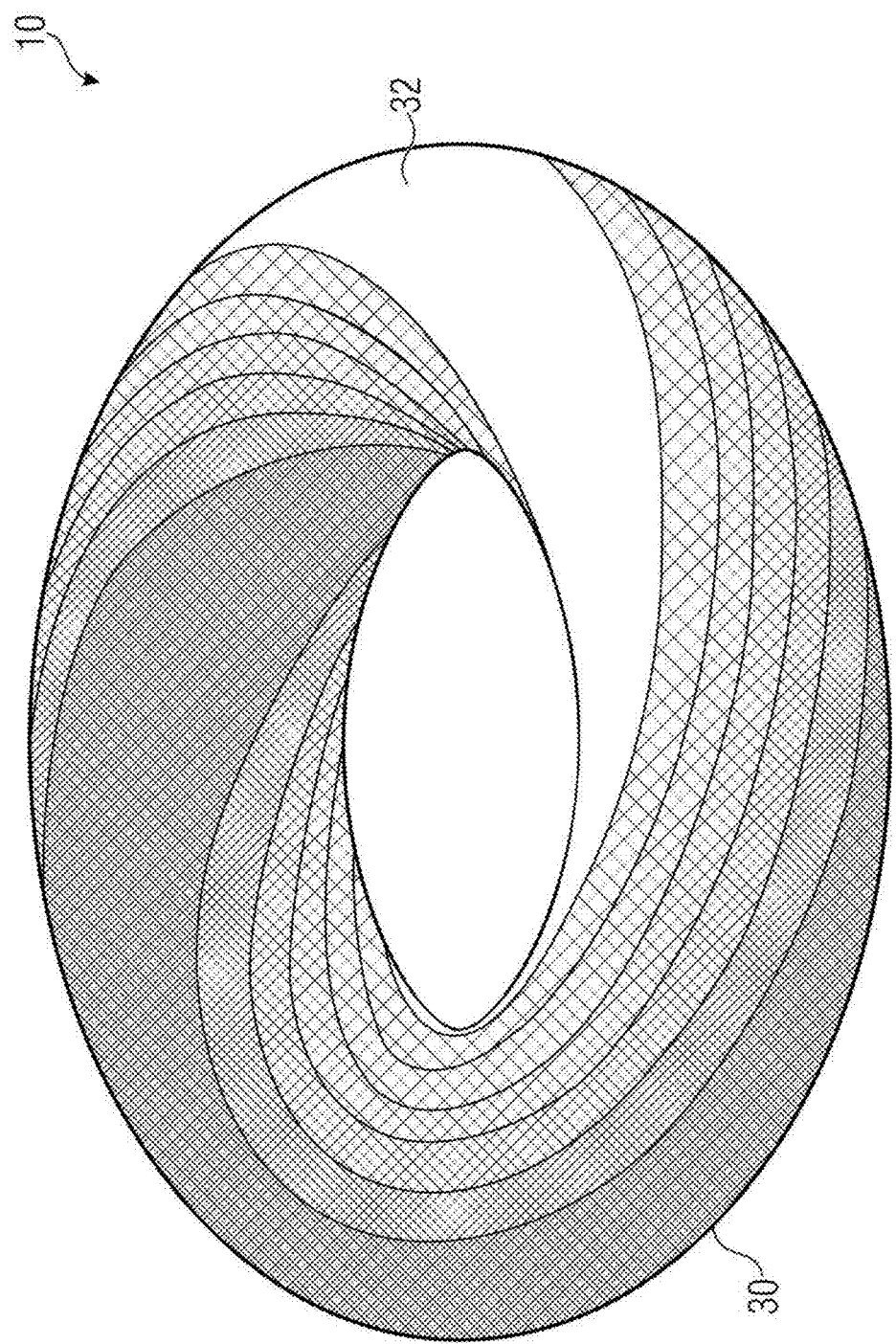
FIG. 5 shows a schematic illustration of a permanent magnet having a ring-shaped body for elucidating the rotating magnetization direction.

In examples in which the permanent magnet is ring-shaped or ring-segment-shaped, the magnetization direction, at least in the angular range corresponding to the movement travel region, can change continuously in accordance with the angular position along the (azimuthal) path of the ring-shaped body. FIG. 5 shows one example of a ring-shaped permanent magnet in which the magnetization direction rotates once by 360°. This results, as is shown in FIG. 5, in a continuous north pole 30, shown with dark hatching, and a continuous south pole, shown with no hatching, on the surface of the permanent magnet 10. As is shown in FIG. 5, both the north pole and the south pole are continuous and rotate along the azimuthal path, formed by the geometric centers of the respective cross sections of the torus, continuously around the path. To put it another way, the magnetization vector (remanence vector) rotates around the tangential unit vector when moving along the ring magnet. To put it another way, the angle between the rotation axis of the permanent magnet and the magnetization direction changes continuously in accordance with the angular position along the path of the ring-shaped body.

If consideration is given to a three-dimensional Cartesian coordinate system (x, y, z), wherein the z-axis corresponds to the rotation axis and to the axis of symmetry of the torus 10 and the plane z=0 divides the torus 10 into two equal halves, in examples the magnetic remanence (permanent magnetization) of the permanent magnet can be calculated as follows:

$$B_{rem,x} = \frac{B_{rem} \cdot x \cdot y}{x^2 + y^2}$$

$$B_{rem,y} = \frac{B_{rem} \cdot y^2}{x^2 + y^2}$$

$$B_{rem,z} = \frac{B_{rem} \cdot x}{\sqrt{x^2 + y^2}}$$

wherein $B_{rem}$ is a constant remanence, $B_{rem,x}$, $B_{rem,y}$, and $B_{rem,z}$ are the respective components of the remanence in the x-, y- and z-directions, and x, y and z are the respective positions of a magnetized volume element in the ring-shaped body in the x-, y- and z-directions.

Figure 6:
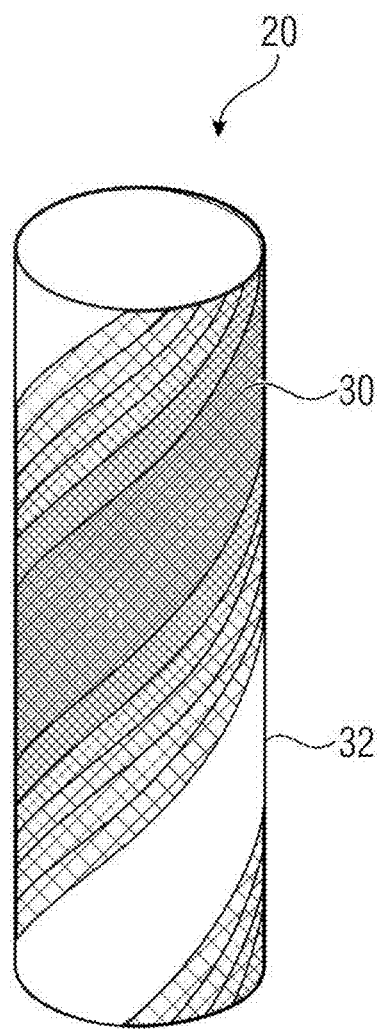
FIG. 6 shows a schematic illustration of an elongate permanent magnet for elucidating the rotation magnetization direction.

FIG. 6 shows illustratively how the magnetization direction can change in the case of the elongate permanent magnet 20. Once again, a north pole 30 is shown with dark hatching and a south pole is shown with light or no hatching at all. As can be discerned in FIG. 6, the magnetization direction rotates about the longitudinal axis of the permanent magnet 20 when moving along the permanent magnet, thus resulting (as also in the case of the ring-shaped permanent magnet in FIG. 5) in a continuous north pole 30 and a continuous south pole 32 on the outer surface of the permanent magnet 20. In FIGS. 5 and 6, weak north poles and south poles arranged between the north pole 30 and the south pole 32 are in each case hatched with different hatchings. In the example shown in FIG. 6, the magnetization direction rotates by 360° along the length of the cylindrical permanent magnet 20. In this case, the movement travel region can correspond to the entire length of the permanent magnet 20. In alternative examples, the length of the permanent magnet along the path (the longitudinal axis) can be longer than the travel, such that the permanent magnet projects beyond the movement travel region at both ends of the movement travel region. This makes it possible for the magnetic field not to be distorted by end effects of the magnet, with the result that it is possible to increase the accuracy of the position determination at the ends of the movement travel region.

As can be discerned in FIGS. 5 and 6, respectively, the surface of the permanent magnet thus has a region having a north pole polarity which extends around the path and is self-contained, that is to say thus has a ring-shaped topology. In the same way, on the surface of the magnet there is situated a region having south pole polarity which extends around the path and is self-contained, that is to say thus also has a ring-shaped topology.

As has been explained, in examples, the magnetization direction rotates by 360° or by a multiple of 360° within the movement travel region. In some examples, however, the magnetization direction can also rotate by less than 360°, for example by 270° or 180°. This is applicable particularly if the permanent magnet does not have a closed ring-shaped body, since the two ends are then at a distance from one another, such that the magnetization direction at the ends of the permanent magnet need not be congruent with the magnetization direction at the beginning.

Examples of the present disclosure provide magnetic angle sensors in which one or more magnetic field sensors, for example sensor chips, are arranged around a rotating shaft to which a ring magnet is secured. The sensors can be arranged on a read circle which is concentric with respect to the rotation axis and is at an axial or radial distance from the surface of the magnet. The axial or radial distance can be referred to as an air gap. The latter should be as small as possible, but large enough to avoid a collision between the rotating parts and the stationary sensors. The distance can typically be in a range of between 1 mm and 3 mm. Examples provide a diverse and economic angle sensor system which can be scaled in particular for shafts having diameters of between 5 mm and 50 mm, wherein examples are insensitive vis-à-vis mounting tolerances and robust vis-à-vis external magnetic interference.

Figure 7:
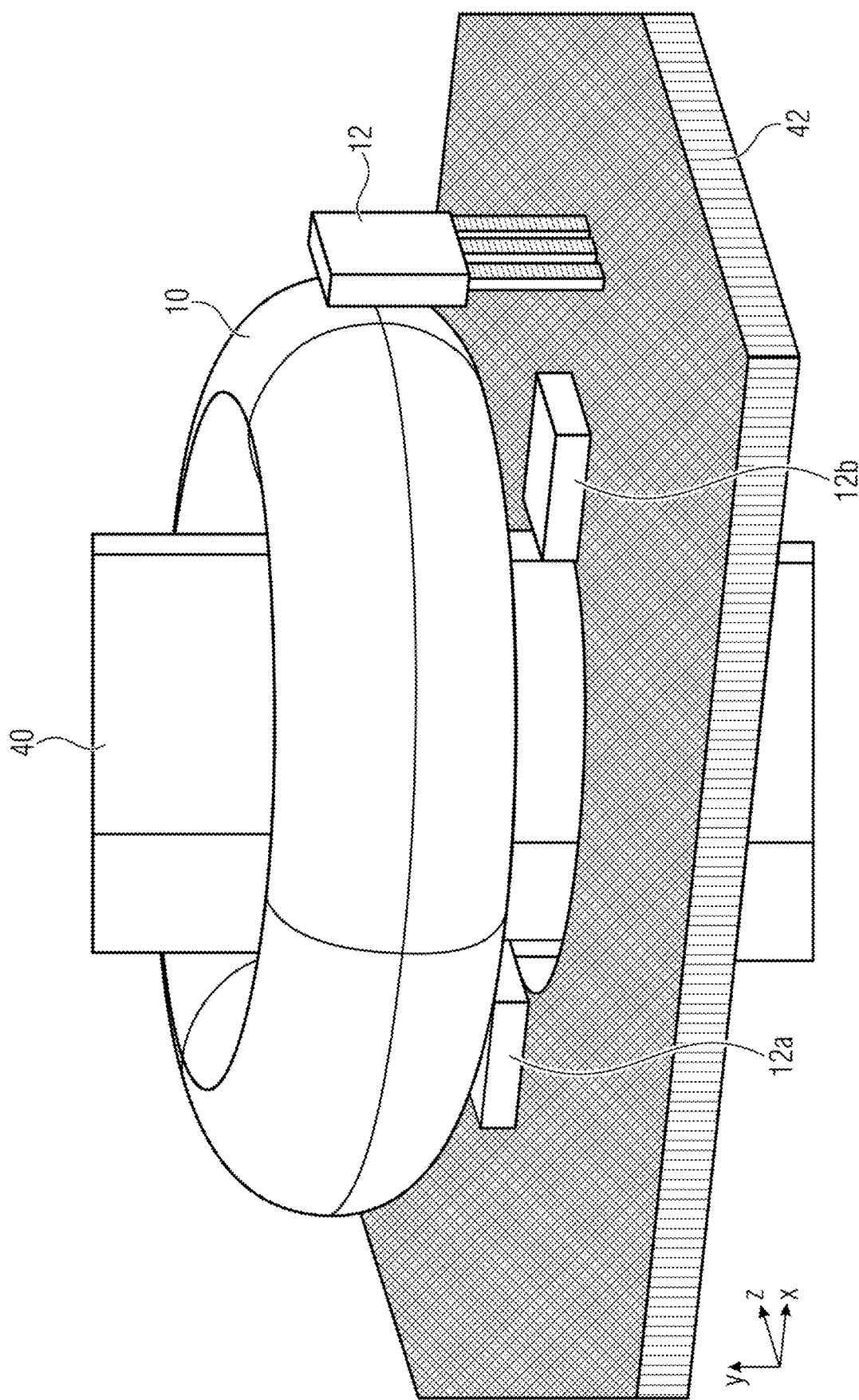
FIG. 7 shows a schematic illustration of one example of a device for determining the position of a permanent magnet having a ring-shaped body.

FIG. 7 shows one example of an angle sensor in which a ring magnet 10 is arranged concentrically around a rotatable shaft 40 and is secured to said shaft 40, the angular position of which is intended to be measured. The position of the ring magnet 10 thus corresponds to the position of the shaft 40. The ring magnet 10 has a compact cross section, wherein the average magnetization of a cross section, in each cross section, points in a direction α which is assigned to the respective cross section. This direction varies in a predefined manner with the position along the circumference of the ring magnet, e.g. with the rotational position φ of the magnet. In the simplest case, when the magnetization direction rotates by 360° along the circumference, it holds true that α=φ. A magnetic field sensor 12 is positioned in a manner spaced apart from the ring magnet by an air gap. As is shown in FIG. 7, further magnetic field sensors 12a and 12b can be provided. The magnetic field sensor 12 is arranged opposite the outer surface of the ring magnet 10 in a radial direction. The magnetic field sensors 12a and 12b are arranged opposite the outer surface of the ring magnet 10 in an axial direction.

If consideration is given to a three-dimensional coordinate system in which the y-axis is parallel to the rotation axis, such that the torus 10 lies in a plane parallel to the x-z-plane, then the magnetic field sensors can be configured to detect a first magnetic field component $B_x$ in the x-direction and a second magnetic field component $B_y$ in the y-direction.

The magnetic field sensor(s) 12, 12a and 12b can be configured to detect gradients of two orthogonal components of the magnetic field. If the horizontal axis in the plane of the drawing is considered to be the x-axis and the vertical axis is considered to be the y-axis, as is shown in FIG. 7, the magnetic field sensors 12, 12a, 12b can be configured to detect the gradients of the two orthogonal components of the magnetic field $dB_x/dx$ and $dB_y/dx$. The evaluation unit (not shown in FIG. 7) can then be configured to calculate the rotational position of the ring magnet 10 and thus of the shaft using these two gradients in accordance with $$\varphi = \arctan2\left(\frac{dB_x}{dx}, k\frac{dB_y}{dx}\right),$$

wherein k is a constant number, for example k=1.

As is shown in FIG. 7, one or more sensor units 12, 12a and 12b, each of which can contain one or more sensor chips, can be arranged on a carrier 42. The sensor units can be configured as SMD units (SMD=Surface Mounted Device), such as the sensor units 12a and 12b. The sensor units can be configured as units provided with connection lines, such as the sensor unit 12. In the case of the sensor units 12a and 12b, the chip surfaces are perpendicular to the rotation axis of the shaft 40 and, in the case of the sensor unit 12, the chip surfaces are orthogonal to radii extending outward from the rotation axis.

In some examples, the device comprises two magnetic field sensors, for example the sensors 12a and 12b in FIG. 7, which are fitted on a common carrier 42, wherein the first magnetic field sensor and the second magnetic field sensor are arranged on opposite sides of the rotation axis of the ring-shaped or ring-segment-shaped body in an axial direction outside the ring-shaped or ring-segment-shaped body. Such an arrangement can be advantageous in order to compensate for mounting tolerances in the system. If the circuit board is positioned incorrectly along the line between the two sensor units 12a and 12b, one sensor unit moves toward the rotation axis and the other unit moves away from the rotation axis, such that the combined effect is smaller than the effect on each individual sensor unit.

Examples of the present disclosure provide a device which can be used as a linear position sensor, wherein the permanent magnet comprises an elongate body, for example a right cylinder, which extends along a path corresponding to a longitudinal axis of the elongate body. One or more magnetic field sensors can once again be positioned in a manner spaced apart from the permanent magnet by an air gap. If the longitudinal axis is defined as direction z, then the magnetization becomes a function of z: α=α(z), wherein the magnetic field changes in accordance with α, such that the sensor can derive the position in the direction z from a measurement of the field.

Figure 8:
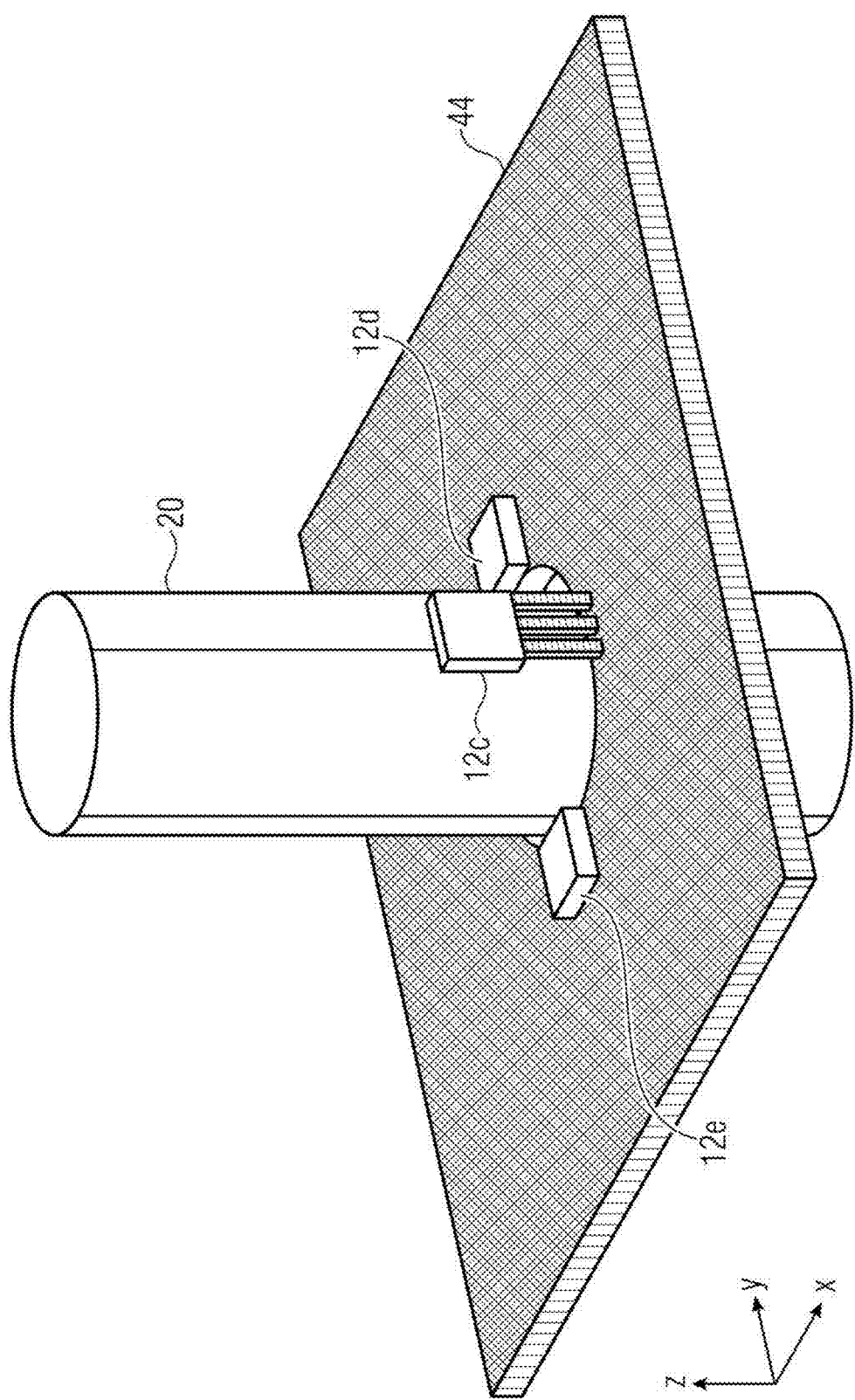
FIG. 8 shows a schematic illustration of one example of a device for determining the position of a permanent magnet having an elongate body.

One example of such a device is shown in FIG. 8 and comprises a permanent magnet 20 in the form of a right cylinder 20 and magnetic field sensors 12c, 12d and 12e, which are fitted on a carrier 44. The magnet 20 extends through an opening in the carrier 44 and is movable in the direction z relative to the carrier and thus relative to the magnetic field sensors 12c, 12d and 12e. To put it another way, a relative movement takes place along a path of the elongate permanent magnet 20 which is formed by the center axis (longitudinal axis) of the permanent magnet. A movement along the length of the cylindrical magnet 20 thus takes place.

If consideration is given to a Cartesian coordinate system whose z-axis is parallel to the longitudinal axis of the permanent magnet 20, then the magnetic field sensors can be designed to detect a first magnetic field component $B_x$ in the x-direction and a second magnetic field component $B_y$ in the y-direction. The magnetic field sensors 12c to 12e can once again be designed to detect gradients of magnetic field components in two mutually perpendicular directions that are perpendicular to the longitudinal axis of the permanent magnet 20.

The position determination can then once again be carried out in a manner similar to that in the case of the angle determination, namely using:

$$z' = \frac{L_z}{360°}\arctan2\left(\frac{dB_y}{dx}, \frac{dB_x}{dx}\right)$$

wherein z' represents the position along the longitudinal axis at which the magnetic field sensor element is situated, and $L_z$ is the length of the cylindrical permanent magnet.

Figure 11:
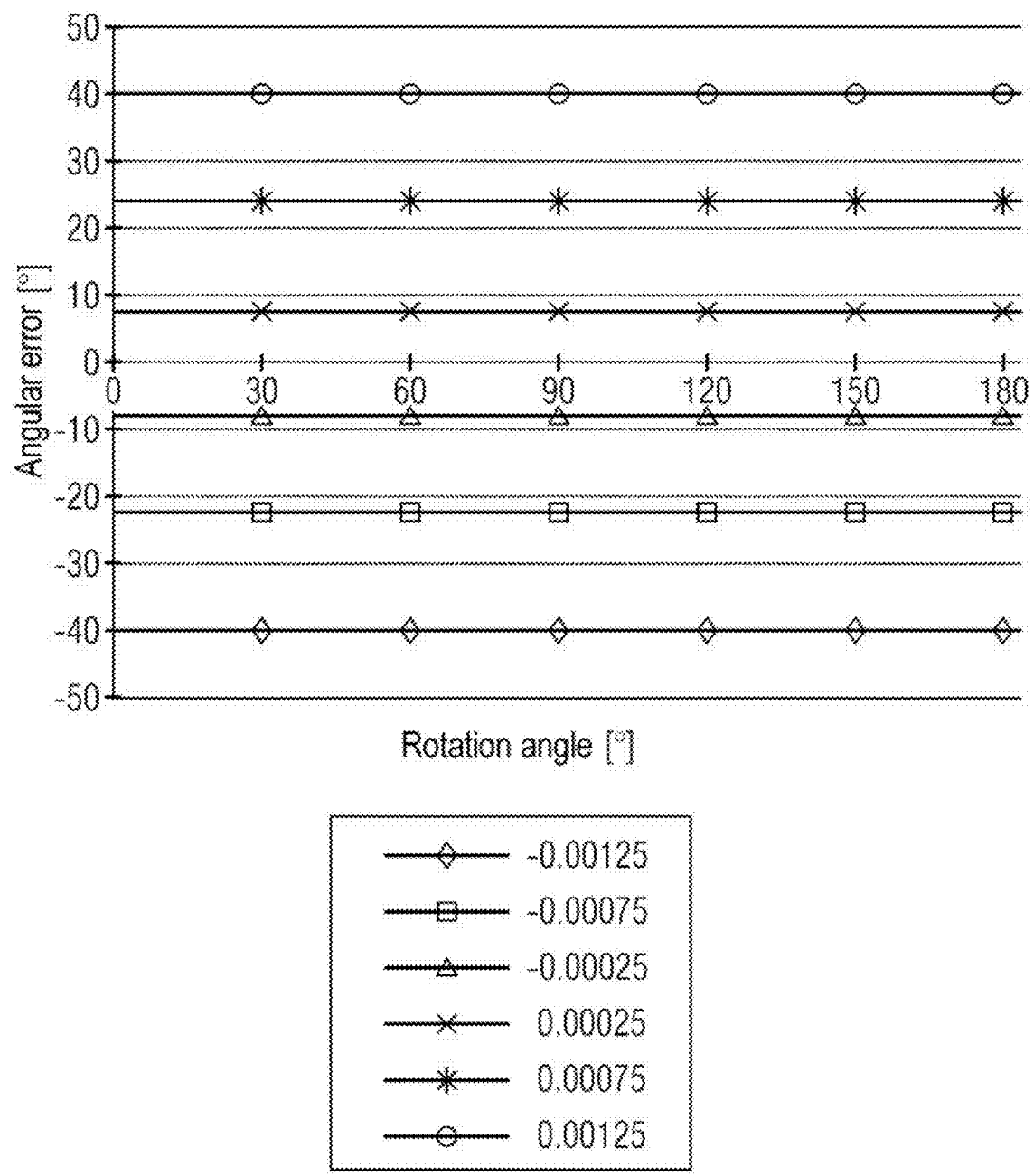
FIG. 11 shows a schematic illustration of an angular error over a rotation of a ring-shaped permanent magnet.

As has already been explained above, in examples of the present disclosure, two magnetic field sensors are arranged on opposite sides of the rotation axis on a common carrier. As shown by the discussion below, it is thereby possible to reduce measurement inaccuracies on account of mounting faults. Consideration shall be given to a corresponding ring-shaped magnet having a circular cross section and a diameter of 7 mm, having a magnetization of $M_x$=cos α, $M_y$=sin α and α=φ. A sensor chip shall be arranged with an air gap of 1.5 mm in an axial direction below the magnet and shall have two gradiometers (magnetic field gradient measuring units) $dB_x/dx$ and $dB_y/dx$. The system shall derive an estimation of the angular position $$\varphi' = \arctan2\left(\frac{dB_y}{dx}, \frac{dB_x}{dx}\right),$$

wherein the angular error shall be φ'−φ. FIG. 11 shows the angular error versus the rotation angle, wherein the parameter of the various graphs shown in FIG. 11 is the x-position of the magnetic field sensor chip. An x-position of zero here represents the correct position. As can be gathered from FIG. 11, the angular error increases with increasing distance from the correct position.

FIG. 11 shows that the angular error is constant over the rotation and its value is dependent on the position error in the x-direction. If this x-position error disappears, the angular error disappears. The two gradiometers are then arranged exactly below the magnetic centroid of the magnet. If the sensor is displaced toward the left or right, the angular error increases. A symmetry exists, however. The magnitude of the angular error is identical if the sensor chip is displaced by the same magnitude toward the left or right. Only the polarity of the angular error changes. It is therefore easy to compensate for this error using a second sensor, which is fitted on an opposite side with respect to the first sensor relative to the rotation axis. If both sensors are fitted on a circuit board and said circuit board moves along the direction of the two sensors, one sensor has a positive angular error and the other has a negative angular error. If the system uses the average value of both sensors, the error cancels out. This procedure is effective as long as the circuit board is displaced along a line extending through both sensors. However, if the circuit board is displaced laterally, the errors no longer cancel out. However, if three or more sensors are arranged symmetrically on a concentric circle and the average value of all three angle readings is formed, position errors/eccentricities of the circuit board in all radial directions can cancel out. Generally, three or more sensors can be arranged correspondingly on a concentric circle symmetrically with an angular distance of 360°/N for N sensors, wherein N is a natural number≥2. Three sensors would then be at an angular distance from one another of respectively 120°, for example.

The magnetic field sensor(s) is/are preferably arranged opposite a magnetic centroid of the permanent magnet.

As has been explained, in examples of the present disclosure, a right cylinder having a homogeneous magnetization in every cross section is used instead of the ring magnet, wherein the magnetization direction rotates when moving along the cylinder axis. Such an arrangement can be used as a linear position sensor, wherein magnetic field gradient sensors are positioned relative to the cylinder and a relative movement takes place between the magnets and the magnetic field gradient sensors. If two sensor units, each of which has two magnetic field gradient sensors, are once again positioned on a circuit board, for example the sensor units 12d and 12e in FIG. 8, one on one side of the magnet with a small air gap of a few millimeters and the other on the other side of the magnet with an air gap of a few millimeters, position errors of the magnet relative to the circuit board in this lateral direction can be cancelled out by averaging of the two sensors. As has been described above with regard to the ring-shaped magnet, here as well it is possible to arrange a plurality of N sensors in a concentric circle with respectively the same angular distance between them around the cylinder axis in order to be able to cancel out position errors/eccentricities of the circuit board in all radial directions.

In some examples of the present disclosure, one magnetic field sensor is used to derive the position of the permanent magnet. In some examples, a plurality of magnetic field sensors are used, the output signals of which are averaged, in order to derive the position of the permanent magnet. As has been described above, it is thereby possible to reduce or eliminate angular errors and in particular angular errors on account of mounting tolerances.

In some examples, the body of the permanent magnet can be a solid body. In other examples, the body of the permanent magnet can be a hollow body. By way of example, the permanent magnet can be formed by a hollow torus. Such a hollow torus can be produced effectively, for example, by a permanent-magnetic coating being applied to a mandrel. The mandrel can act as a carrier structure and should be magnetically inert. To put it another way, its relative permeability should be close to 1, $\mu_r$=1, which holds true for example for copper, aluminum, stainless steel and plastics. The outer surface of the permanent magnet can be regarded as separating the three-dimensional space into an inner and an outer part, wherein, in accordance with the present disclosure, the magnetic field is detected only in the outer part, and not in the inner part. Consequently, collisions between the magnetic field sensors and the magnets can be prevented and the arrangement and the mounting are simple since no sensor units have to be introduced into parts of the magnet. Furthermore, the magnetic field outside the permanent magnet is greatly inhomogeneous, with the result that gradient sensors can be used, while the magnetic field within a hollow torus is substantially homogeneous, for which reason gradients cannot be detected, which makes the angle detection susceptible to external magnetic interference fields.

Consequently, in some examples of the present disclosure, exclusively detected magnetic field gradients are used to determine the position of the permanent magnet, which reduces the susceptibility to external magnetic interference fields, since magnetic field gradient sensors are not adversely affected by homogeneous magnetic interference fields.

In other examples of the present disclosure, instead of the magnetic field gradients, detected magnetic fields are used to detect the position of the permanent magnet. Such examples can be used if no relevant magnetic interference fields should be expected in an application, since the entire arrangement is magnetically shielded, for example, such as by a steel housing. In such examples, the position of the permanent magnet can be detected just from two magnetic field components in accordance with the following equation:

$$\varphi' = \arctan_2(B_y, B_x)$$

for a ring-shaped permanent magnet or $$z' = \frac{L_z}{360°}\arctan_2(B_y, B_x)$$

for an elongate straight permanent magnet.

Magnetic field gradient sensors can be implemented straightforwardly, for example, by magnetic field sensor elements being positioned at a specific distance from one another and the measured signals being subtracted from one another. By way of example, $dB_y/dx$ is the gradient of the $B_y$ component along the x-direction. This can be detected by positioning a $B_y$ field sensor at a position x1 and a second $B_y$ field sensor at a position x2. The gradient is then approximately equal to the difference $B_y(x1)-B_y(x2)$ divided by (x1−x2). The approximation is more accurate if the distance is small. This gradient is detected at a location (x1+x2)/2, e.g. exactly in the middle between the two locations x1 and x2.

In some examples, the permanent magnet can comprise a ring-shaped body which is correspondingly magnetized in a movement travel region of less than 360° such that the magnetization direction along the path rotates continuously around the path. Outside this movement travel region, it is then possible for the ring not to be magnetized or to be magnetized more weakly. In some examples, the rotating magnetization direction can continue at both ends of the movement travel region, for example by 30°, in order to reduce or to prevent distortions at the ends of the movement travel region.

Alternative examples of arrangements as to how magnetic field sensors can be arranged in the case of a toroidal ring magnet will now be explained with reference to FIGS. 9A, 9B, 10A and 10B.

Figure 9A:
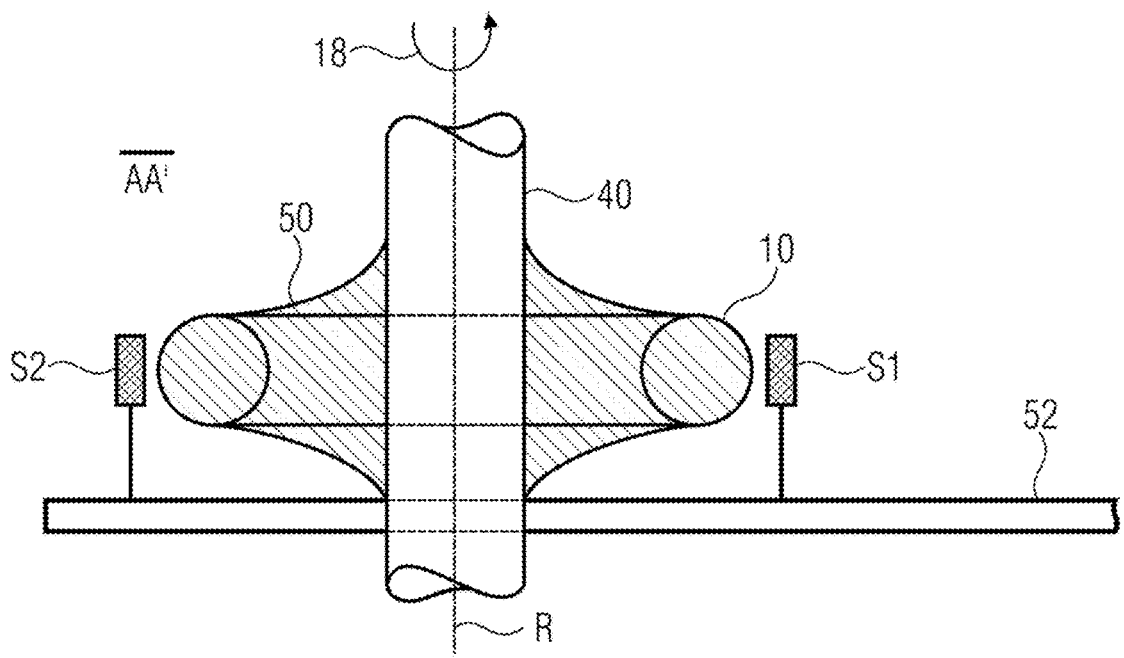
FIGS. 9A, 9B show schematic illustrations showing one example of an arrangement of magnetic field sensors in the case of a permanent magnet having a ring-shaped body.
Figure 9B:
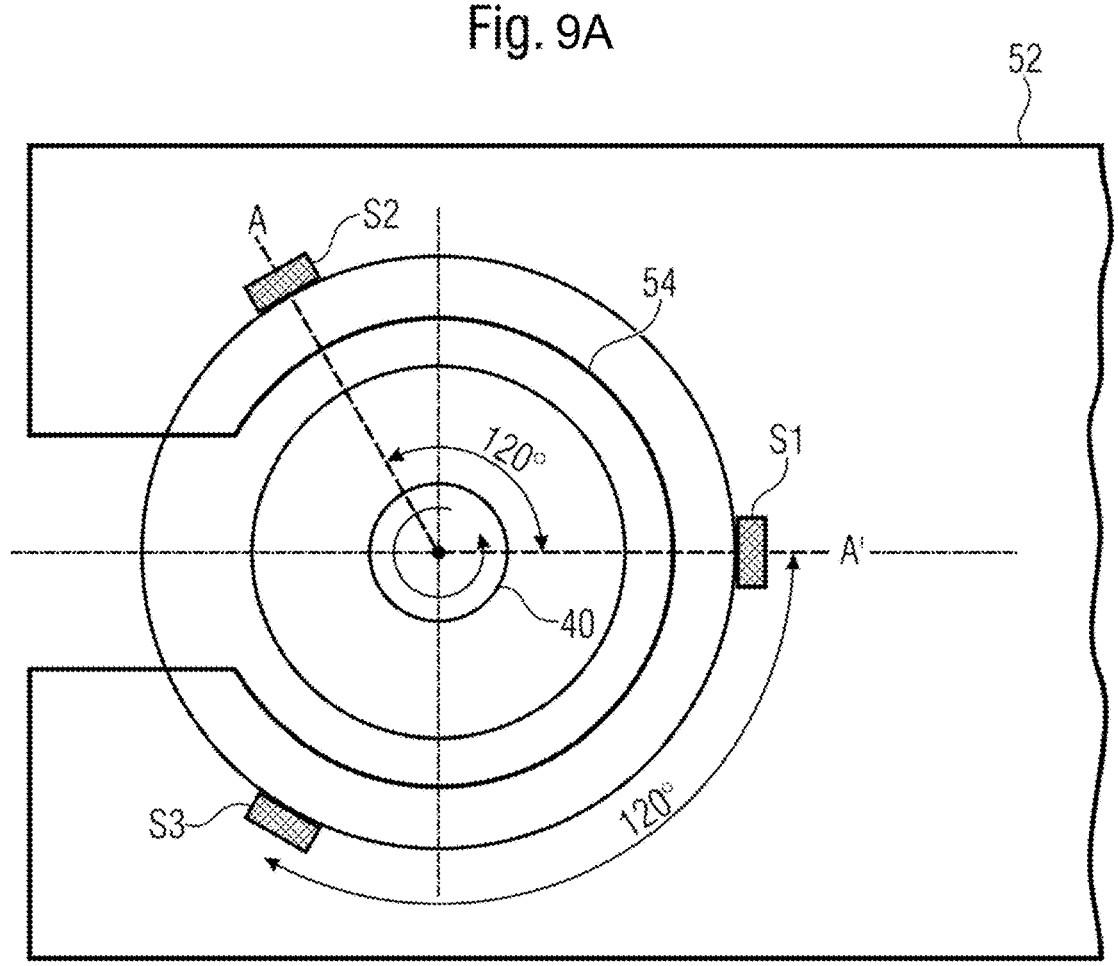

FIG. 9A shows a schematic cross section along a line A-A' from FIG. 9B, and FIG. 9B shows a plan view of a corresponding arrangement. A ring-shaped permanent magnet 10 is fitted to a shaft 40 by way of a mount 50, such that said permanent magnet rotates with the shaft 40. Magnetic field sensor elements S1, S2 and S3 are arranged on a carrier 52. The magnetic field sensors S1, S2 and S3 are arranged on a circle that is concentric with respect to the rotation axis R of the shaft 40, with a distance of respectively 120° between them. The magnetic field sensors S1, S2 and S3 are arranged radially outside the external diameter of the ring magnet 10. A cutout 54 is formed in the carrier 52, the shaft 40 extending through said cutout. Such an arrangement makes it possible to compensate for positioning errors of the carrier relative to the permanent magnet in all directions.

Figure 10A:
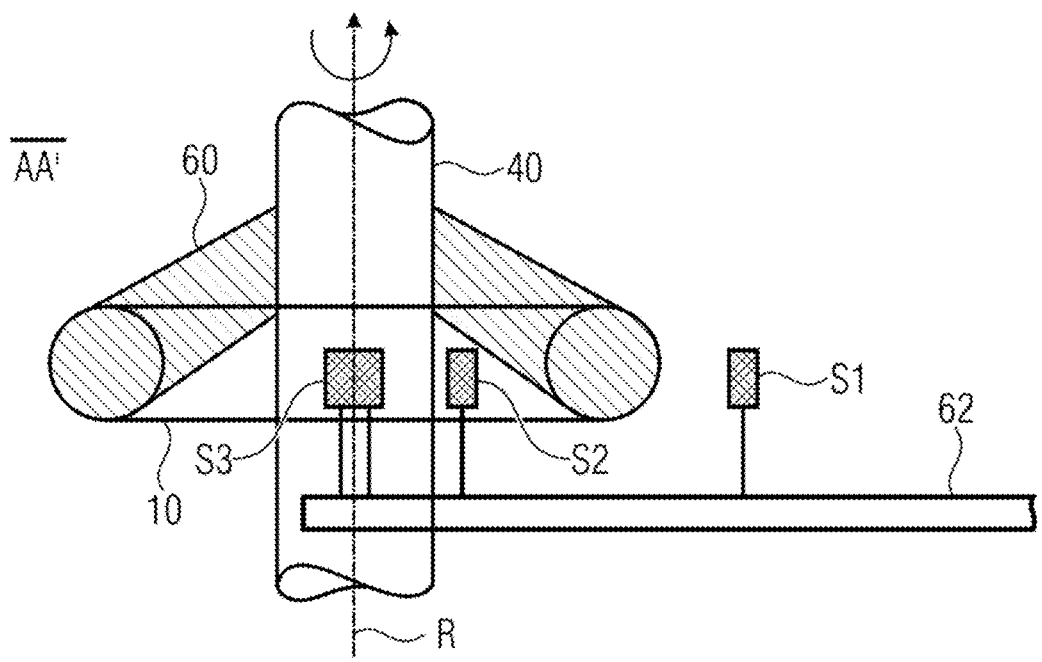
FIGS. 10A, 10B show schematic illustrations showing an alternative example of an arrangement of magnetic field sensors in the case of a permanent magnet having a ring-shaped body.
Figure 10B:
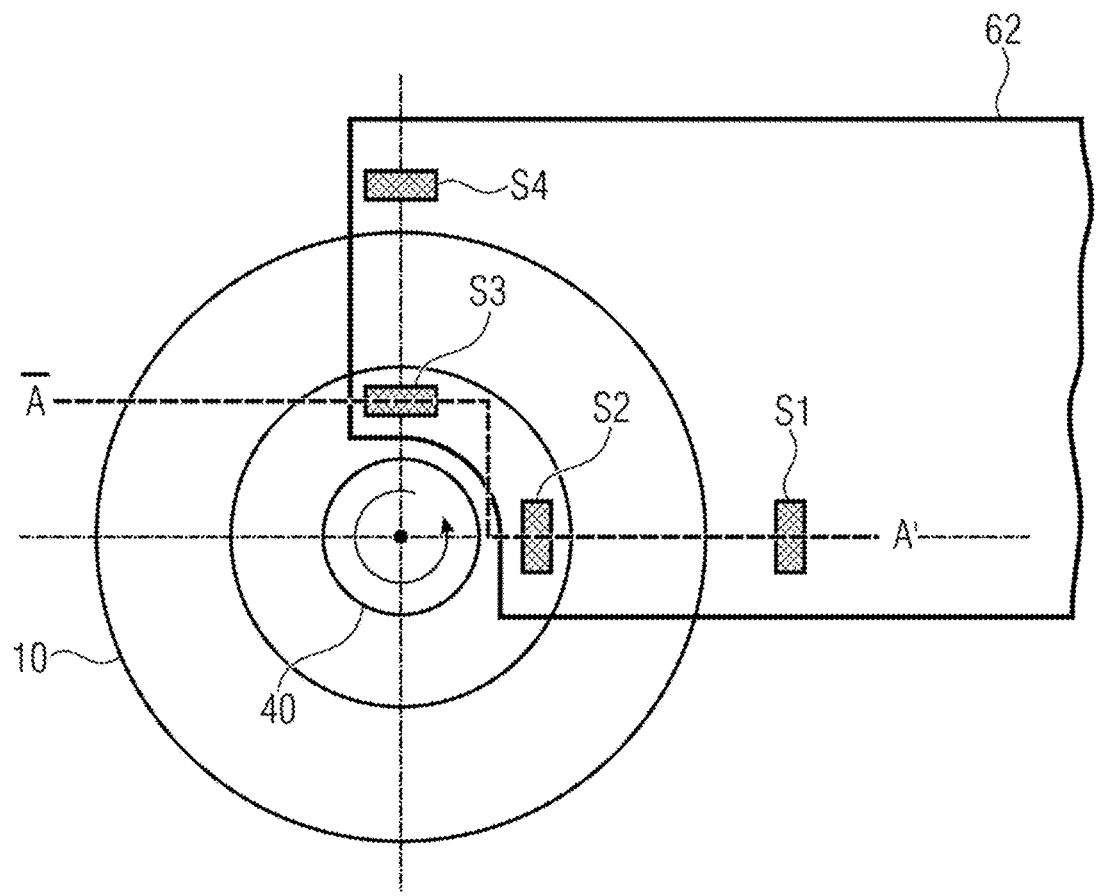

FIGS. 10A and 10B show an alternative arrangement of magnetic sensor elements S1 to S4 relative to a ring-shaped permanent magnet 10, which is coupled to a shaft 40 and rotates with the shaft 40 about a rotation axis R. FIG. 10A schematically shows a section along the line A-A' from FIG. 10B. The ring magnet 10 is coupled to the shaft by way of a mount 60, wherein the mount 60 is configured in such a way that it can pass the sensor elements S2 and S3 during a rotation. In the example shown, the magnetic field sensors S1 and S2 of a first pair and the magnetic field sensors S3 and S4 of a second pair are respectively arranged on opposite sides of the cross section of the ring magnet 10. Consequently, respectively one sensor of each pair, the sensors S2 and S3, is arranged within the internal diameter of the permanent magnet and the other sensor of each pair, the sensors S1 and S4, is arranged outside the external diameter of the permanent magnet. Furthermore, the two magnetic field sensor pairs are arranged at an angle with respect to one another, 90°, in the example shown. The magnetic field sensors are arranged on a common carrier 62. In the case, too, of an arrangement such as is shown in FIGS. 10A and 10B, it is possible to compensate for angular errors on account of a mounting tolerance of the common carrier 62 with respect to the shaft.

In FIGS. 9A to 10B, the magnetic field sensors are embodied in each case as sensors connected via connection lines to the carrier 52, 62, which can be a circuit board, for example. Alternatively, in the example shown in FIGS. 9A and 9B, magnetic field sensors could also be used which are arranged as SMD elements below the ring magnet 10, e.g. between the ring magnet 10 and the circuit board 52, once again respectively with an angular distance of 120° between them.

FIG. 12 shows one example of a method for detecting the position of a permanent magnet, wherein at 100 a permanent magnet is moved relative to a magnetic field sensor. The permanent magnet comprises a body extending along a path, wherein, in cross section perpendicular to the path, the body has a compact form, wherein in a movement travel region the permanent magnet has a continuous north pole and a continuous south pole and is magnetized in such a way that the magnetization direction along the path rotates continuously around the path. At 102, a magnetic field generated by the permanent magnet is detected using a magnetic field sensor. At 104, the position of the permanent magnet is determined using the detected magnetic field. The permanent magnet is arranged in an inner spatial region and the at least one sensor is arranged in an outer spatial region, wherein in cross section perpendicular to the path the inner spatial region and the outer spatial region are separated from one another by an outwardly convex line.

In some examples, the evaluation circuit can be implemented by an integrated circuit. In some examples, the evaluation circuit can be implemented by a microprocessor circuit, which can be programmed to process the output signals of the magnetic field sensor(s), in order to determine the position of the permanent magnet. In some examples, the evaluation circuit can be implemented by an FPGA (field programmable gate array). In some examples, the evaluation circuit can be implemented partly using hardware and partly using software.

In some examples of the disclosure, a relative movement takes place between the permanent magnet and the magnetic field sensor. The relative movement takes place along the path along which the body of the permanent magnet extends. In the case of a ring-shaped permanent magnet, said relative movement takes place as a result of the rotation of the ring-shaped permanent magnet, whereas in the case of a straight permanent magnet, said relative movement takes place as a result of a straight movement.

Examples of the present disclosure thus provide a position sensor system which detects the position of a movable structural element along a direction of movement over a specific length. The system comprises a permanent magnet extending over said length in said direction of movement. The magnet can have a compact cross-sectional form in a cross section perpendicular to the direction of movement. The direction of movement corresponds to the path along which the magnet extends. The magnet can be magnetized homogeneously over the length in every cross section. The magnetization direction can be a uniform function over the path position over the length. The system can comprise a first gradiometer and a second gradiometer, which detect respective magnetic field gradients that are perpendicular to the path direction, e.g. the direction of movement. In this case, x, y and z are mutually perpendicular axes and $B_x$ and $B_y$ are components of the magnetic field along the x-direction and the y-direction, respectively. d/dx and d/dy denote a derivative along the x- and y-directions. The system can calculate the position of the magnet and thus of the movable structural element from the detected magnetic field gradient, in accordance with the function $$\varphi = \arctan_2\left(\frac{dB_x}{dx}, k\frac{dB_y}{dx}\right),$$

wherein k is a constant number, for example 1.

Although some aspects of the present disclosure have been described as a feature in the context of a device, it is clear that such a description can likewise be regarded as a description of corresponding method features. Although some aspects have been described as a feature in association with a method, it is clear that such a description can also be regarded as a description of corresponding features of a device or of the functionality of a device.

In the detailed description above, in some instances different features have been grouped together in the examples in order to rationalize the disclosure. This type of disclosure ought not to be interpreted as the intention that the claimed examples have more features than are expressly indicated in each claim. Rather, as represented by the following claims, the subject matter can reside in fewer than all features of an individual example disclosed. Consequently, the claims that follow are hereby incorporated in the detailed description, wherein each claim can be representative of a dedicated separate example. While each claim can be representative of a dedicated separate example, it should be noted that although dependent claims refer back in the claims to a specific combination with one or more other claims, other examples also comprise a combination of dependent claims with the subject matter of any other dependent claim or a combination of the feature with other dependent or independent claims. Such combinations shall be encompassed, unless an explanation is given that a specific combination is not intended. Furthermore, the intention is for a combination of features of a claim with any other independent claim also to be encompassed, even if this claim is not directly dependent on the independent claim.

The examples described above are merely illustrative for the principles of the present disclosure. It should be understood that modifications and variations of the arrangements and of the details described are obvious to those skilled in the art. Therefore, the intention is for the disclosure to be limited only by the appended patent claims and not by the specific details set out for the purpose of the description and explanation of the examples.

What is claimed is:

1. A device, comprising:
a permanent magnet having a body extending along an azimuthal path,
wherein, in a cross section perpendicular to the azimuthal path, the body has a compact form, and
wherein, in a movement travel region, the permanent magnet has a continuous north pole and a continuous south pole and is magnetized in such a way that a magnetization direction, of the permanent magnet, is perpendicular to the azimuthal path and rotates continuously around the azimuthal path when moving along the azimuthal path,
wherein the continuous north pole and the continuous south pole rotate continuously around the azimuthal path based on the magnetization direction rotating continuously around the azimuthal path;
at least one magnetic field sensor configured to detect a magnetic field generated by the permanent magnet based on a relative movement between the permanent magnet and the at least one magnetic field sensor; and
an evaluation circuit configured to determine a position of the permanent magnet using the detected magnetic field,
wherein the permanent magnet is arranged in an inner spatial region and the at least one magnetic field sensor is arranged in an outer spatial region, and
wherein, in the cross section perpendicular to the azimuthal path, the inner spatial region and the outer spatial region are separated from one another by an outwardly convex line.

2. The device as claimed in claim 1, wherein the azimuthal path is circular or circle-segment-shaped and the body is a ring-shaped body or a ring-segment-shaped body that is rotatable about a rotation axis of the permanent magnet.

3. The device as claimed in claim 2, wherein, in a Cartesian coordinate system having an x-axis, a y-axis, and a z-axis, the z-axis corresponds to the rotation axis of the permanent magnet and a plane z=0 divides the permanent magnet into two equal halves, and
wherein a magnetic remanence of the permanent magnet is as follows:

$$B_{rem,x} = \frac{B_{rem} \cdot x \cdot y}{x^2 + y^2}$$

$$B_{rem,y} = \frac{B_{rem} \cdot y^2}{x^2 + y^2}$$

$$B_{rem,z} = \frac{B_{rem} \cdot x}{\sqrt{x^2 + y^2}}$$

wherein $B_{rem}$ is a constant remanence, $B_{rem,x}$, $B_{rem,y}$, and $B_{rem,z}$ are respective components of the magnetic remanence in an x-direction, a y-direction, and a z-direction, and x, y and z are respective positions in the body in the x-direction, the y-direction, and the z-direction.

4. The device as claimed in claim 2, wherein the magnetization direction, at least in an angular range corresponding to the movement travel region, changes continuously in accordance with an angular position along the azimuthal path.

5. The device as claimed in claim 4, wherein an angle α, between the rotation axis of the permanent magnet and the magnetization direction, changes in accordance with the angular position along the azimuthal path.

6. The device as claimed in claim 2, wherein the ring-shaped body or the ring-segment-shaped body is secured to a shaft concentrically, such that an angular position of the permanent magnet corresponds to an angular position of the shaft.

7. The device as claimed in claim 2, wherein the at least one magnetic field sensor comprises at least one of:

a first magnetic field sensor which is arranged opposite an outer surface of the ring-shaped body or the ring-segment-shaped body in a radial direction, or a second magnetic field sensor which is arranged opposite the outer surface of the ring-shaped body or the ring-segment-shaped body in an axial direction.

8. The device as claimed in claim 7, wherein the at least one magnetic field sensor comprises N magnetic field sensors which are fitted on a common carrier in a circle that is concentric with respect to the rotation axis with an angular distance of 360°/N between the N magnetic field sensors.

9. The device as claimed in claim 1, wherein the at least one magnetic field sensor, when detecting the magnetic field, is configured to:
detect a first magnetic field component in a first direction, which is parallel to a rotation axis of the permanent magnet, and
detect a second magnetic field component in a second direction, which is perpendicular to the rotation axis and perpendicular to a direction of the azimuthal path; and
wherein the evaluation circuit, when determining the position of the permanent magnet using the detected magnetic field, is configured to:
determine the position of the permanent magnet using the first detected magnetic field component and the second detected magnetic field component.

10. The device as claimed in claim 1, wherein the at least one magnetic field sensor comprises N magnetic field sensors which are fitted on a common carrier in a circle that is concentric with respect to the azimuthal path with an angular distance of 360°/N between the N magnetic field sensors.

11. The device as claimed in claim 1, wherein the at least one magnetic field sensor, when detecting the magnetic field, is configured to:
detect a first magnetic field component in a first direction, and
detect a second magnetic field component in a second direction, which is different than the first direction; and
wherein the evaluation circuit, when determining the position of the permanent magnet using the detected magnetic field, is configured to:
determine the position of the permanent magnet using the first detected magnetic field component and the second detected magnetic field component.

12. The device as claimed in claim 11, wherein the first direction is perpendicular to the second direction.

13. The device as claimed in claim 9, wherein the at least one magnetic field sensor, when detecting the magnetic field, is configured to:
detect magnetic field gradients of the first detected magnetic field component and the second detected magnetic field component, and
wherein the evaluation circuit, when determining the position of the permanent magnet using the detected magnetic field, is configured to:
determine the position of the permanent magnet using the detected magnetic field gradients.

14. The device as claimed in claim 1, wherein the magnetization direction, within the movement travel region, rotates by 360° or a multiple of 360° around the azimuthal path.

15. The device as claimed in claim 1, wherein a magnetization of the permanent magnet in every cross section of the body that is perpendicular to the azimuthal path is homogeneous in one direction.

16. The device as claimed in claim 1, wherein a ratio of arbitrary dimensions in mutually perpendicular directions of the cross section perpendicular to the azimuthal path is not greater than 2.

17. A method for determining a position of a permanent magnet,
wherein the permanent magnet has a body extending along an azimuthal path,
wherein, in a cross section perpendicular to the azimuthal path, the body has a compact form,
wherein, in a movement travel region, the permanent magnet has a continuous north pole and a continuous south pole and is magnetized in such a way that a magnetization direction of the permanent magnet is perpendicular to the azimuthal path and rotates around the azimuthal path when moving along the azimuthal path,
wherein the continuous north pole and the continuous south pole rotate continuously around the azimuthal path based on the magnetization direction rotating continuously around the azimuthal path, and
wherein the method comprises:
detecting a magnetic field generated by the permanent magnet using at least one magnetic field sensor based on a relative movement between the permanent magnet and the at least one magnetic field sensor; and
determining the position of the permanent magnet using the detected magnetic field,
wherein the permanent magnet is arranged in an inner spatial region and the at least one magnetic field sensor is arranged in an outer spatial region, and
wherein, in the cross section perpendicular to the azimuthal path, the inner spatial region and the outer spatial region are separated from one another by an outwardly convex line.

18. The method as claimed in claim 17, wherein the azimuthal path is circular or circle-segment-shaped and the body is a ring-shaped body or a ring-segment-shaped body that is rotatable about a rotation axis of the permanent magnet.

19. The method as claimed in claim 18, wherein detecting the magnetic field comprises:
detecting a first magnetic field component in a first direction, which is parallel to the rotation axis, and
detecting a second magnetic field component in a second direction, which is perpendicular to the rotation axis; and
wherein determining the position of the permanent magnet using the detected magnetic field comprises:
determining the position of the permanent magnet using the first magnetic field component and the second magnetic field component.

20. The method as claimed in claim 17, wherein detecting the magnetic field comprises:
detecting a first magnetic field component in a first direction, and
detecting a second magnetic field component in a second direction, which is different than the first direction; and
wherein determining the position of the permanent magnet using the detected magnetic field comprises:
determining the position of the permanent magnet using the first magnetic field component and the second magnetic field component.

21. The method as claimed in claim 20, wherein detecting the magnetic field comprises:

detecting magnetic field gradients of the first magnetic field component and the second magnetic field component, wherein the position of the permanent magnet is determined using the detected magnetic field gradients.

22. The method as claimed in claim 18, wherein, in a Cartesian coordinate system having an x-axis, a y-axis, and a z-axis, the z-axis corresponds to the rotation axis of the permanent magnet and a plane z=0 divides the permanent magnet into two equal halves, and wherein a magnetic remanence of the permanent magnet is as follows:

$$B_{rem,x} = \frac{B_{rem} \cdot x \cdot y}{x^2 + y^2}$$

$$B_{rem,y} = \frac{B_{rem} \cdot y^2}{x^2 + y^2}$$

$$B_{rem,z} = \frac{B_{rem} \cdot x}{\sqrt{x^2 + y^2}}$$

wherein $B_{rem}$ is a constant remanence, $B_{rem,x}$, $B_{rem,y}$, and $B_{rem,z}$ are respective components of the magnetic remanence in an x-direction, a y-direction, and a z-direction, and x, y and z are respective positions in the body in the x-direction, the y-direction, and the z-direction.

23. The method as claimed in claim 18, wherein the magnetization direction, at least in an angular range corresponding to the movement travel region, changes continuously in accordance with an angular position along the azimuthal path.

24. The method as claimed in claim 23, wherein an angle α, between the rotation axis of the permanent magnet and the magnetization direction, changes in accordance with the angular position along the azimuthal path.

* * * * *